(12) United States Patent
Zhou et al.

(10) Patent No.: US 6,811,890 B1
(45) Date of Patent: Nov. 2, 2004

(54) INTERMEDIATE LAYER FOR ANTIFERROMAGNETICALLY EXCHANGE COUPLED MEDIA

(75) Inventors: Jianing Richard Zhou, Fremont, CA (US); Geon Choe, San Jose, CA (US); Kenneth E. Johnson, Morgan Hill, CA (US)

(73) Assignee: Maxtor Corporation, Longmont, CO (US)

(*) Notice: Subject to any disclaimer, the term of this patent is extended or adjusted under 35 U.S.C. 154(b) by 17 days.

(21) Appl. No.: 10/227,019

(22) Filed: Aug. 23, 2002

Related U.S. Application Data
(60) Provisional application No. 60/371,233, filed on Apr. 8, 2002.

(51) Int. Cl.[7] .................................................. G11B 5/66
(52) U.S. Cl. ........................ 428/611; 428/637; 428/669; 428/678; 428/686; 428/336; 428/694 TM
(58) Field of Search ................................ 428/611, 637, 428/669, 678, 686, 336, 694 TM

(56) References Cited

U.S. PATENT DOCUMENTS

| | | | |
|---|---|---|---|
| 5,051,288 A | 9/1991 | Ahlert et al. | 428/64 |
| 5,701,223 A | 12/1997 | Fontana, Jr. et al. | 360/113 |
| 6,153,320 A | 11/2000 | Parkin | 428/693 |
| 6,280,813 B1 | 8/2001 | Carey et al. | 428/65.3 |
| 6,326,637 B1 | 12/2001 | Parkin et al. | 257/9 |
| 6,372,330 B1 | 4/2002 | Do et al. | 428/212 |
| 6,383,668 B1 | 5/2002 | Fullerton et al. | 428/694 |
| 6,641,935 B1 * | 11/2003 | Li et al. | 428/694 TS |
| 2001/0038931 A1 | 11/2001 | Carey et al. | 428/694 |
| 2002/0028356 A1 | 3/2002 | Kawato et al. | 428/694 |
| 2002/0028357 A1 | 3/2002 | Shukh et al. | 428/694 |
| 2002/0045070 A1 | 4/2002 | Sakakima et al. | 428/694 |
| 2002/0064689 A1 * | 5/2002 | Yamanaka et al. | 428/694 TM |
| 2003/0104253 A1 * | 6/2003 | Osawa et al. | 428/694 TM |
| 2003/0148143 A1 * | 8/2003 | Kanbe et al. | 428/694 TS |

OTHER PUBLICATIONS

E.N. Abarra et al., "Longitudinal Magnetic Recording Media with Thermal Stabilization Layers," *Applied Physics Letters*, vol. 77, No. 16 (Oct. 16, 2000), pp. 2581–2583.

Eric E. Fullerton et al., "Antiferromagnetically Coupled Magnetic Media Layers for Thermally Stable High–Density Recording," *Applied Physics Letters*, vol. 77, No. 23 (Dec. 4, 2000), pp. 3806–3808.

(List continued on next page.)

*Primary Examiner*—Kevin M. Bernatz
(74) *Attorney, Agent, or Firm*—Sheridan Ross P.C.

(57) ABSTRACT

The present invention is directed to a disk for information storage. The disk, in one embodiment, comprises a substrate 204, antiferromagnetically exchange coupled first and second ferromagnetic films 220 and 236, a spacer film 228, and at least one buffer film 232 located between the first and second ferromagnetic films. One or more of the following statements is true with respect to the buffer film 232: (i) the buffer film 232 is paramagnetic; (ii) the buffer film 232 is superparamagnetic at temperatures of about 50° C. or less; and (iii) a lattice mismatch between the buffer film 232 and at least one of the first and second ferromagnetic films 220 and 236 in contact with the buffer film is about 5% or less.

61 Claims, 15 Drawing Sheets

OTHER PUBLICATIONS

H. Yamanaka et al., "Enhancement of Exchange Coupling for Antiferromagnetically Coupled Media," *Applied Physics letters*, vol. 91, No. 10 (May 15, 2002), pp. 8614–8616.

Z. S. Shan et al., "Effects of Inserting Thin Co Layers on the Magnetic and Reversal Properties of Synthetic Antiferromagnetically coupled media," Applied Physics Letters, vol. 91 No. 10, (May 15, 2002), pp. 7682–7684.

Er. Girt et al., "Different Designs and Limits of Longitudinal Magnetic Recording Media," *Applied Physics Letters*, vol. 91, No. 10 (May 15, 2002), pp. 7679–81.

A. Inomata et al., "Advanced Synthetic Ferrimagnetic Media (Invited)," *Applied Physics Letters*, vol. 91, No. 10 (May 15, 2002), pp. 7671–75.

"Laminated Antiferromagnetically Coupled (LAC) Recording Media", *Media & Materials: A Research Group of DSI*, at www.dsi.nus.edu.sg/tracks/media/research/LAC%20Media.html (Aug. 21, 2002).

E. Noel Abarra et al., "Synthetic Ferrimagnetic Media," *FUJITSU Sci. Tech. J.*, Vo. 37, No. 2 (Dec. 2001), pp. 145–154.

\* cited by examiner

| CoCrRu IL (A) | KV/k T | Ho (Oe) | THERMAL DECAY |
|---|---|---|---|
| 0.0 | 51.8 | 8156 | |
| 0.9 | 51.8 | 8099 | 1.00 |
| 6.3 | 57.8 | 7666 | 0.70 |
| 13.5 | 58.2 | 6936 | 0.60 |

VSM HALF LOOPS OF THE CoCrRu LAYERS IN A Cr/CrMo/CoCrRu LAYERED STRUCTURE. THE SUPERPARAMETRIC COMPONENT OF THE NiP SUBSTRATE HAS BEEN REMOVED FROM EACH LOOP.

| IL | WITHOUT IL | 10 Å CoCrPtTa | 10 Å CoCrRu | 10 Å CoCr35 |
|---|---|---|---|---|
| $\Delta\omega_{50}(°)$ | 7.23 | 6.36 | 6.45 | 6.21 |

INTERMEDIATE LAYER FOR ANTIFERROMAGNETICALLY EXCHANGE COUPLED MEDIA

CROSS REFERENCE TO RELATED APPLICATIONS

The present application claims the benefits under 35 U.S.C. Section 119(e) of U.S. Provisional Application Ser. No. 60/371,233, to Zhou et al., entitled "Superparamagnetic CoCrRu Intermediate Layer for Antiferromagnetically Exchange Coupled Media", filed Apr. 8, 2002, which is incorporated herein by this reference.

FIELD OF THE INVENTION

The invention relates generally to magnetic recording media and specifically to thermally stable, antiferromagnetically coupled exchange media.

BACKGROUND OF THE INVENTION

Magnetic hard-disk drives ("HDDs") can store and retrieve large amounts of information. The information is commonly stored as a series of bits on a stack of thin-film magnetic disk platters, each of which is an aluminum alloy or glass substrate coated on each side with a thin-film magnetic materials layers and one or more protective layers. A bit is identified as a flux transition. Linear bit density is measured as the number of flux transitions per unit length, and areal bit density is measured as the number of flux transitions per unit area. Typically, the higher the linear and areal bit densities, the lower the signal-to-noise ratio. Read-write heads, typically located on both sides of each platter, record and retrieve bits from circumferential tracks on the magnetic disks.

Although great strides have been made over the past decade in increasing the linear and areal bit densities of hard drives, information storage requirements have increased dramatically. An ongoing challenge of disk drive manufacturers is to provide even higher linear and areal bit densities and higher data recording rates for thin-film magnetic disks. To realize higher linear and areal bit densities and data recording rates, it is necessary to provide magnetic recording media having higher signal to noise ratios (SNR) and lower magnetization thickness products ("Mrt"). As will be appreciated, the Mrt is the product of the remanent magnetization Mr, the magnetic moment per unit volume of ferromagnetic material, and the thickness t of the magnetic layer. These objectives have been realized by using smaller and smaller grain sizes in the magnetic layer. Average grain diameters are now less than 10 nm.

The use of smaller grain sizes had a detrimental impact on the thermal stability of grain magnetization, particularly at high bit densities where the demagnetizing fields are significant. The equation which determines the stability of a recording medium against thermal fluctuations is $K_u V/k_B T$, where $K_u$ is the magnetic anisotropic energy of the magnetic medium, V is the volume of a magnetic grain, $k_B$ is Boltzmann's constant, and T is the absolute temperature. Magnetic media having higher values for $K_u V/k_B T$ are generally more stable against thermal fluctuations. When magnetic media have lower values and are therefore thermally unstable, increases in temperature can cause loss of stored information through the onset of the superparamagnetic effect. When a magnetic recording layer exhibits superparamagnetic behavior, the layer, in the remanent state (in the absence of an applied magnetic field), returns to its lowest energy state in which the magnetic domain states are randomly distributed. This random distribution typically causes the recording layer to have a zero or near zero average magnetic moment. Flux transitions recorded in the layer are generally lost when the layer behaves superparamagnetically.

Attempts to control thermal instability typically attempt to increase the value of the numerator in the above equation, namely $K_u V$. In one approach, a higher anisotropy material is used to provide a higher value for $K_u$ while maintaining the grain volume at a low level to realize desired linear and areal densities. However, the increase in $K_u$ is limited by the point where the coercivity $H_c$, which is approximately equal to $K_u/Mr$, becomes too great to be written by a conventional recording head. As will be appreciated, the "coercivity" of a magnetic material refers to the value of the magnetic field required to reduce the remanence magnetic flux to zero, i.e., the field required to erase a stored bit of information. In the other approach, the effective magnetic volume V of the magnetic grains is increased.

FIG. 1 shows a cross-section of a magnetic disk that provides an increased magnetic volume while maintaining a low Mrt. The disk employs a laminated information layer 100 formed above an underlayer 104 and supporting substrate 108. In the laminated information layer, the magnetic moments 112 and 116 in the upper and lower ferromagnetic films 120 and 124, respectively, are antiferromagnetically coupled together across a very thin (less than 10 Å thick) nonmagnetic spacer film 128 (which is typically pure (undoped) ruthenium). The anti-parallel orientations of the moments 112 and 116 add destructively to provide a low net magnetic moment for the laminated magnetic layer 100. The thermal stability of the laminated layer 100 is, theoretically, substantially enhanced because the grains in the lower magnetic layer 124 are magnetically coupled with the grains in the upper magnetic layer 120 and thus the physical volume of layers 120 and 124 add constructively to provide a higher value for V. Thus, the films can contain very small diameter grains while theoretically maintaining good thermal stability. However, the degree of the improvement in the thermal stability has been far less than expected, particularly when the boron content of the upper ferromagnetic layer (layer 120 in FIG. 1) exceeds 7 atomic %. Although buffer layers (i.e., various ferromagnetic Co-based layers) have been used between the spacer and ferromagnetic films 128 and 120 and 124 to provide enhanced thermal stability, the SNRs for such media have been substantially decreased, particularly when the buffer layer is inserted between the spacer film 128 and the upper ferromagnetic film 120. The decrease in SNR for such media is believed to be due to the high exchange coupling between grains within the ferromagnetic buffer layer. Compared to non-antiferromagnetically-coupled media, the laminated magnetic layer has a higher coercivity and lower writability due to the increased effective total magnetic layer thickness.

SUMMARY OF THE INVENTION

These and other needs are addressed by the various media embodiments and configurations of the present invention. The present invention is directed to a nonferromagnetic buffer film that is particularly useful in magnetic media having ferromagnetically or antiferromagnetically coupled ferromagnetic films.

In one medium configuration, the buffer film is paramagnetic and is located between a pair of ferromagnetic films.

As will be appreciated, a paramagnetic material has a Curie temperature below room temperature (e.g., about 25° C.) and displays similar magnetic behavior to a superparamagnetic material. A paramagnetic material typically has a relative permeability that is slightly greater than unity and independent of the magnetizing force.

In another medium configuration, the buffer film has superparamagnetic properties within the operating temperature range of the disk. To realize such properties, the buffer film can, for example, have a value of $K_u V$ that is no more than about 25 kT to provide the desired degree of thermal instability.

In yet another medium configuration, the buffer film is selected so as to provide epitaxial growth conditions for an adjacent and overlying ferromagnetic film. To realize such properties, the buffer film preferably has a lattice mismatch with the adjacent and overlying ferromagnetic film of no more than about 5%. The buffer film is nonferromagnetic. As used herein, a "nonferromagnetic" material does not display ferromagnetic behavior under the operating temperature range of the disk. "Nonferromagnetic" materials may display paramagnetic or superparamagnetic behavior or be magnetically nonreactive.

The buffer films of the above configurations can be particularly useful in antiferromagnetically exchange coupled media, where thermal stability and noise have traditionally been problems. The use of a nonferromagnetic buffer film in AFC media can provide increased thermal stability (a higher $K_u V/k_B T$ value) for the information layer compared to a AFC media which do not have the buffer film. This increase in thermal stability is more significant for boron contents in the ferromagnetic films in excess of 7 atomic %. The use of a paramagnetic or superparamagnetic buffer film can also increase the AFC medium's remanence coercivity while reducing the instrinsic switching field compared to AFC media which do not have the buffer film. This can provide improved writability even at high recording rates. The use of a paramagnetic or superparamagnetic buffer film can maintain the AFC medium's signal-to-noise ratio performance (unlike other methods (such as using ferromagnetic buffer films)) and the antiferromagnetic exchange coupling through a wide buffer film thickness range.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2:
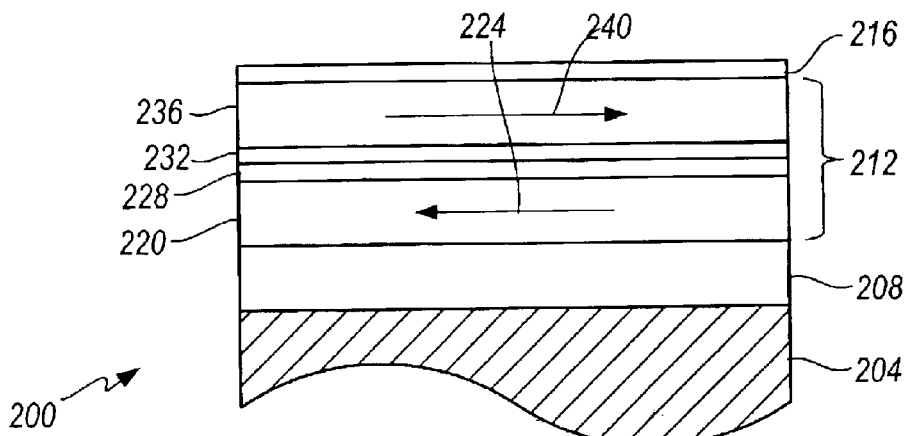
FIG. 2 is a cross-sectional view of a magnetic disk according to a first embodiment of the present invention.

An antiferromagnetically coupled (AFC) (longitudinal) magnetic disk 200 according to a first embodiment is shown in FIG. 2. The disk 200 includes a substrate 204 supporting an underlayer 208, a laminated information layer 212, and an overcoat layer 216. The laminated information layer 212 comprises a (lower) stabilizing ferromagnetic film 220 having a first magnetization-thickness product 224 oriented in a first direction, a spacer film 228, an intermediate buffer film 232, and an (upper) information-containing magnetic film 236 having a second magnetization-thickness product 240 oriented in a second direction opposite to the first direction.

The substrate 204 can be any material suitable for the information layer and is data zone textured. For example, the substrate can be an aluminum plate, NiP-plated aluminum alloy plate (such as aluminum-manganese), a ceramic plate, a glass-based plate, a glass-ceramic plate, a carbon plate, a titanium plate, a titanium alloy plate, a manganese plate, a manganese alloy plate, and a plastic plate.

The underlayer 208 can comprise one or more films suitable for deposition of the stabilizing and information-containing films 220 and 236, preferably by epitaxial growth, to cause the films 220 and 236 to have the (11$\bar{2}$0) lattice plane being parallel to the film plane. Preferably, the underlayer 208 comprises one or more at least substantially nonferromagnetic films that enhance the growth of the hexagonal close-packed or HCP crystal structure in the stabilizing and information-containing films 220 and 236.

The underlayer 208 can itself have a crystal structure other than HCP, such as body centered cubic or BCC (e.g., chromium (Cr) or a chromium alloy). In one configuration (not shown), the underlayer comprises a buffer film and a seed film between the substrate 204 and the stabilizing film 224 to improve the growth of the buffer film. More preferably, the underlayer 208 is comprised of two layers which are mostly Cr or CrX alloys where X=vanadium (V), molybdenum (Mo), tungsten (W), manganese (Mn), ruthenium (Ru), and titanium (Ti). The preferred underlayer thickness ranges from about 2 to about 200 Å.

The stabilizing and information-containing films 220 and 236, respectively, can be composed of any suitable material (s) for recording and/or storing information magnetically. The compositions of the films are not required to be identical. Each of the films 220 and 236 can be composed of a bulk, thick-film or thin-film material that stores information magnetically. Preferably, the films 220 and 236 are thin-film materials comprising iron, nickel, cobalt, or alloys of iron, nickel, cobalt, with one or more of samarium, chromium, tantalum, platinum, boron, ruthenium, and silver. More preferably, films comprise from about 50 to about 90 atomic % cobalt, from about 0 to about 40 atomic % chromium, from about 0 to about 30 atomic % platinum, and from about 0 to about 20 atomic % boron.

To provide an acceptable degree of thermal stability, it is preferable to configure the films, particularly the information-containing film, to possess a relatively high $K_u V$ value. Preferably, the value of $K_u V$ is at least about 40 and more preferably ranges from about 55 to about 75 kT. To provide an acceptable grain volume, crystal size distribution and film thickness are carefully controlled. Preferably, the mean grain size (diameter) is at least about 50 Å and more preferably ranges from about 65 to about 85 Å. The grain size distribution is relatively concentrated, with at least 80% of the grains having a diameter of at least about 40 Å and more preferably ranging from about 60 to about 90 Å. The stabilizing film 220 typically has a thickness ranging from about 5 to about 200 Å, and the information-containing film 236 (which is generally thicker than the stabilizing film 220) typically has a thickness ranging from about 30 to about 300 Å.

The spacer film 228 can be any material capable of causing antiferromagnetic exchange coupling between the two films 220 and 236. This typically requires the material used in the spacer film 228 to possess the HCP crystal structure. Generally, the exchange coupling oscillates from ferromagnetic to antiferromagnetic with increasing spacer film thickness. The material combinations include ferromagnetic films 220 and 236 made of may of the same materials used in conventional non-AFC magnetic media, such as $CoCr_xPt_yB_zTa_m$, where X ranges from about 5 to about 35 atomic %, Y from about 2 to about 20 atomic %, Z from about 2 to about 25 atomic %, and M from about 0 to about 10 atomic %, and nonferromagnetic spacer films 228 such as Ru, Cr, Rh, Ir, Cu and their alloys. Preferably, the spacer film 228 is pure (undoped) Ru and has a thickness ranging from about 1 to about 20 Å.

The intermediate buffer film 232 is configured to provide favorable conditions for epitaxial growth in the overlying information-containing film 236 and to exhibit paramagnetic and/or superparamagnetic behavior throughout the operating temperature range of the disk. The operating temperature range is defined as temperatures typically of about 65° C. or less, more typically about 50° C. or less, and more typically ranging from about −30 to about 50° C.

Figure 1:
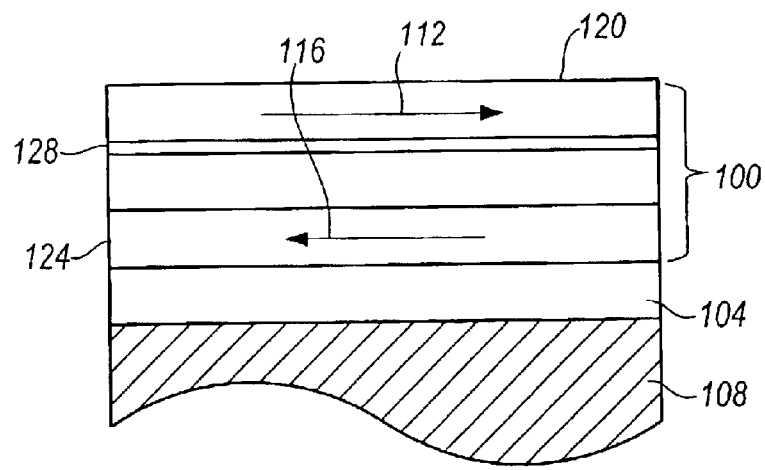
FIG. 1 is a cross-sectional view of a conventional magnetic disk incorporating antiferromagnetically coupled magnetic media films.

While not wishing to be bound by any theory, it is believed that the lower than expected thermal stability of conventional AFC media is due to the low miscibility at the interface between the spacer and upper magnetic films 128 and 120 (FIG. 1). The low miscibility causes unfavorable conditions for epitaxial growth in the upper magnetic film 120, leading to a smaller average grain size and/or a broader grain size distribution in the upper magnetic film 120. The small average grain sizes and/or broad grain size distribution provides lower volume values for a significant portion of the magnetic domains, resulting in unacceptable levels of thermal stability in these magnetic domains.

When a superparamagnetic layer (rather than a ferromagnetic layer) is used for layer 232 (FIG. 2), the overall media noise is lower. While not wishing to be bound by any theory, a reasonable explanation is that the grain-grain exchange coupling within the superparamagnetic layer is much lower than a ferromagnetic layer; therefore, a superparamagnetic layer 232 does not add extra noise to the overall media noise while a ferromagnetic layer does. Layers 232 and 236 are exchange coupled and layer 232's contribution to the total magnetic moment depends on layer 232's thickness.

The intermediate buffer film 232 (FIG. 2) is selected to display paramagnetic and/or superparamagnetic behavior over the operating temperature range of the disk to provide a relatively "quiet" film and therefore a higher SNR compared to ferromagnetic buffer layers. The exchange coupling between grains of the paramagnetic and superparamagnetic film is relatively low, causing such films to be relatively "quiet" (or have a low noise figure). It is believed that the low noise figure is due at least in part to exchange coupling between the buffer film 232 and the adjacent information-containing film 236 The remanent magnetic field of the information-containing film 236 will cause the magnetic dipoles in the buffer film 232 to be aligned and a magnetic moment to be displayed by the buffer film 232. The magnetic moment of the buffer film 232 is however very low and typically negligible compared to the moment of the information-containing film 236.

It is surprising and unexpected that the use of a paramagnetic and/or superparamagnetic material between the spacer film 128 and the adjacent information-containing film 120 (FIG. 1) will not disrupt the antiferromagnetic exchange coupling between the stabilizing and information-containing films 124 and 120. Referring to FIG. 1, buffer films displaying ferromagnetic behavior over the operating temperature range of the disk have been used between the spacer and upper magnetic films 128 and 124 based on the belief that a nonferromagnetic film would disrupt the AFC behavior of the disk. Surprisingly, the buffer film 232 (FIG. 2) of the present invention is able to sustain AFC behavior over a relatively wide buffer film thickness range.

The composition of the intermediate buffer film 232 preferably provides a film having the characteristics noted above and a number of other desirable characteristics. For example, the buffer film 232 should have an HCP crystal structure. This is so to enhance HCP-crystal structure in the information-containing film 236. The lattice mismatch (and interfacial free energy) at the interface between the buffer film 232 and the information-containing film 236 should favor epitaxial growth. The lattice mismatch between the information-containing film 236 and the buffer film 232 is determined by the following equation:

lattice mismatch=lattice parameter of film 236–lattice parameter of buffer film 232 lattice parameter of buffer film 232.

The preferred mismatch between the two films is no more than about 5%, more preferably no more than about 3%, and even more preferably no more than about 2%. When the material is not paramagnetic, the value of $K_uV$ is preferably maintained below a level sufficient for the material to possess superparamagnetic behavior. Preferably, the value of $K_uV$ is no more than about 25 kT. As noted, the control of this product can be realized by selecting appropriate materials to provide a desired value for $K_u$ and/or an appropriate grain size distribution and/or buffer film thickness to provide a desired value for V. The value for V used in determining the foregoing values is the average grain volume in the buffer film. Finally, the buffer film 232 should have a high degree of miscibility with the information-containing film 236.

The preferred composition of the buffer film 232 is a cobalt alloy of the form CoX, where X can be one or more elements selected from the group of chromium, ruthenium, tantalum, and platinum. The concentration of cobalt is preferably at least about 50 atomic % and more typically ranges from about 60 to about 80 atomic %, with the balance being the X elements. Particularly preferred compositions for realizing superparamagnetic behavior are CoCrRu (where cobalt ranges from about 55 to about 75 atomic %, chromium from about 0 to about 40 atomic %, and ruthenium from about 0 to about 30 atomic %) and for realizing paramagnetic behavior are CoCr (where cobalt ranges from about 55 to about 75 atomic % and chromium from about 25 to about 45 atomic %).

The preferred thickness of the buffer film 232 can influence the AFC behavior of the media. Preferably the thickness of the buffer film ranges from about 0.5 to about 25 Å and more preferably from about 1 to about 15 Å.

Finally, the overcoat layer 216 can be one or more protective films positioned over the information-containing film 236 to inhibit corrosion of any underlying material and/or to provide an acceptable surface for landing of the read and/or write head. A preferred protective layer includes various forms of carbons (magnetron sputtered, ion beam deposited, etc.). The protective layer typically has a thickness ranging from about 10 to about 300 Å.

The various layers and films are preferably deposited using sputtering techniques well known to those of ordinary skill in the art.

The disk 200 can include a lubricant layer (not shown) located adjacent to the protective layer and separated from the information layer by the protective layer. A preferred lubricant layer includes a perfluoropolymer. The lubricant layer typically has a thickness ranging from about 5 to about 100 Å.

Finally, the disk 200 can include a nickel-phosphorus layer (not shown) that is located between the substrate and the underlayer. The nickel-phosphorus layer preferably has an ablated or at least substantially smooth top surface and a thickness ranging from about 0.0001 to about 0.001 inches.

Figure 3:
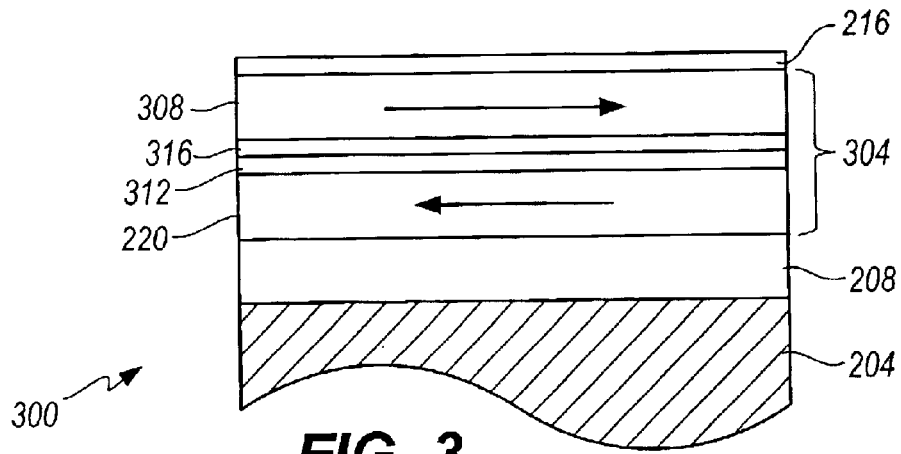
FIG. 3 is a cross-sectional view of a magnetic disk according to a second embodiment of the present invention.
Figure 4:
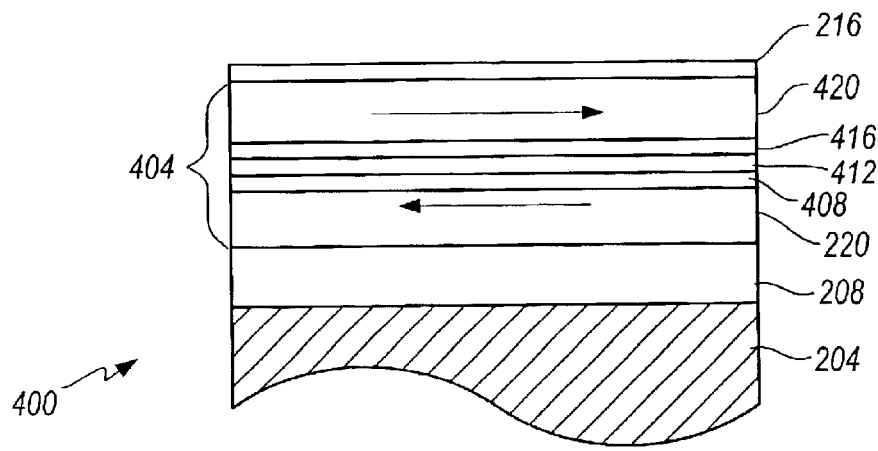
FIG. 4 is a cross-sectional view of a magnetic disk according to a third embodiment of the present invention.
Figure 5:
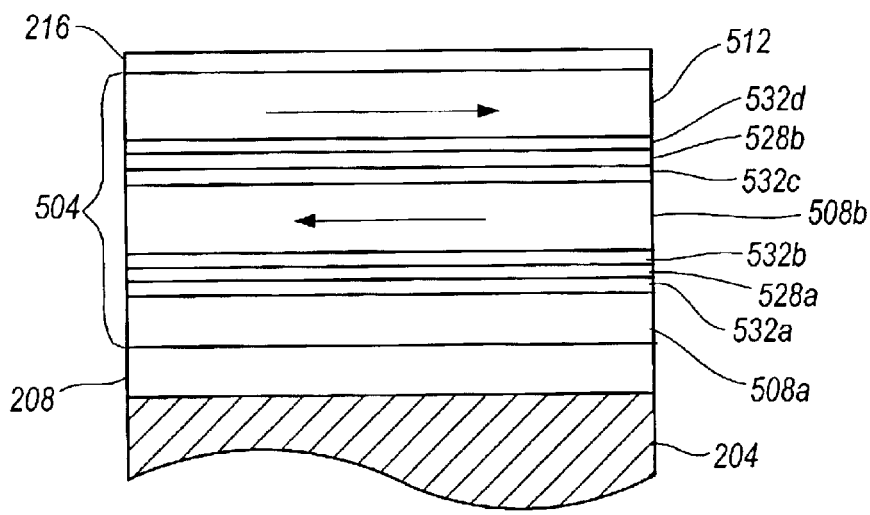
FIG. 5 is a cross-sectional view of a magnetic disk according to a fourth embodiment of the present invention.

A number of different disk configurations are possible using the concepts of the present invention. Examples are presented in FIGS. 3-5. In FIGS. 3-5, AFC disks 300, 400, and 500, respectively, are depicted, each comprising a substrate 204, underlayer 208, laminated information layers 304, 404, and 504, respectively, and overcoat layer 216.

Figure 14:
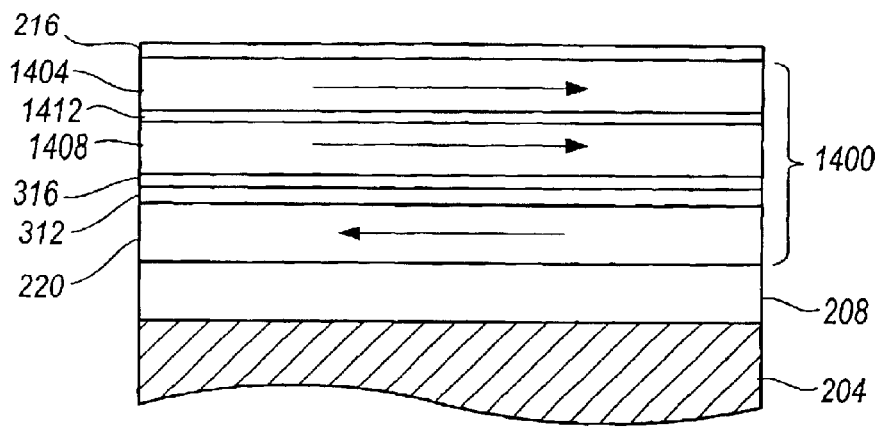
FIGS. 14-19 are cross-sectional views of magnetic disks according to other embodiments of the present invention.
Figure 15:
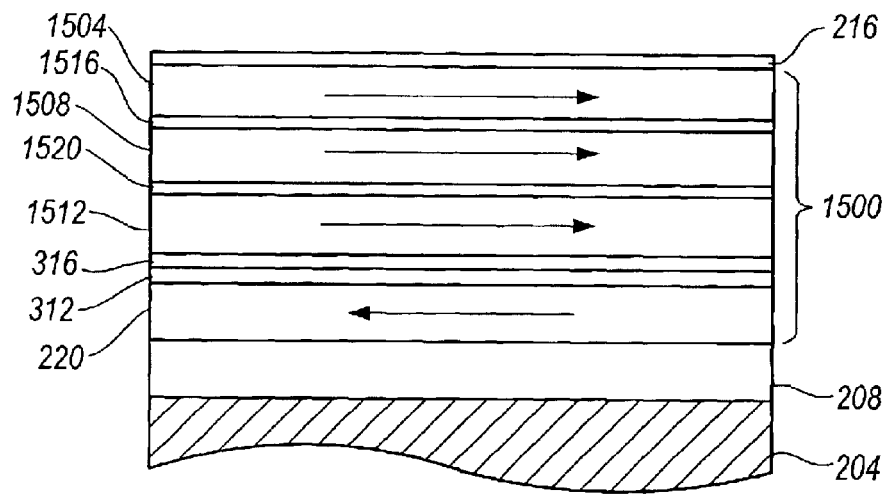

The information layer 304 of FIG. 3 comprises stabilizing and information-containing films 220 and 308 separated by spacer film 316 and intermediate buffer film 312. This embodiment differs from the embodiment of FIG. 2 in that the positions of the buffer film and spacer film are reversed. FIGS. 14 and 15 show alternative disk configurations using the spacer film 316 and intermediate buffer film 312 of the disk 300. The laminated information layer 1400 (FIG. 14) comprises first and second ferromagnetically coupled layers 1404 and 1408 separated by an interlayer 1412, while laminated information layer 1500 (FIG. 15) comprises first, second, and third ferromagnetically coupled layers 1504, 1508, and 1512 separated by interlayers 1516 and 1520.

Figure 16:
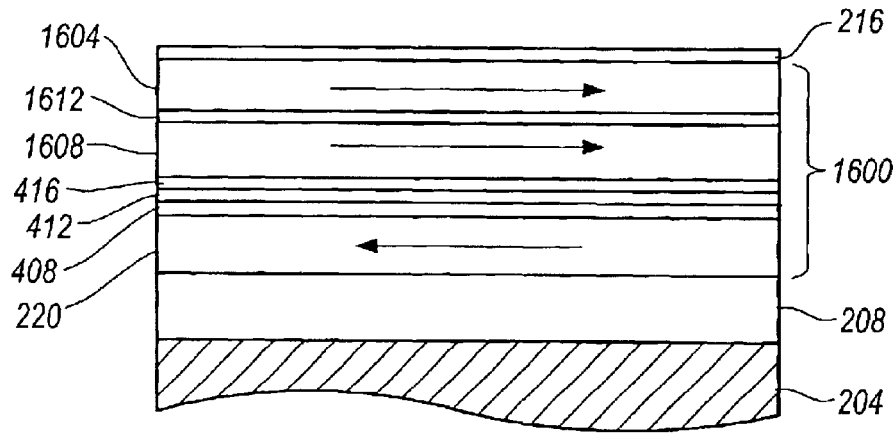
Figure 17:
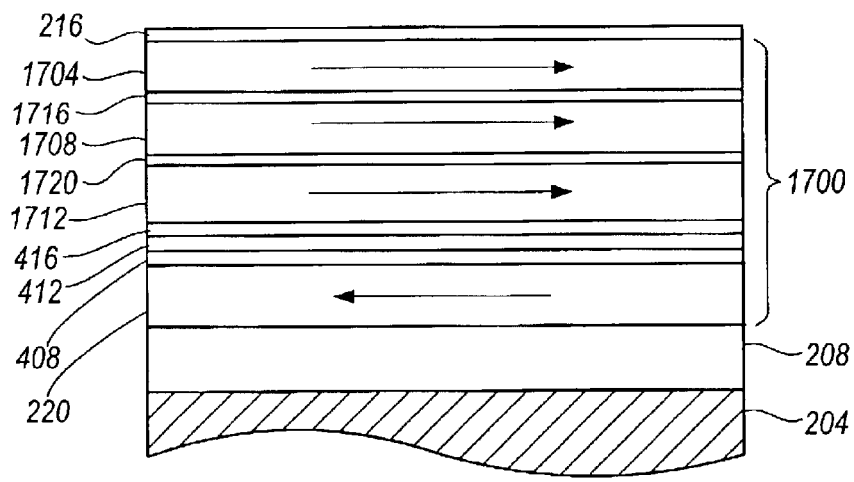

The information layer 404 of FIG. 4 comprises stabilizing and information-containing film 220 and 420 separated by spacer film 412 and a pair of buffer films 408 and 416. This embodiment differs from the embodiments of FIGS. 2 and 3 in that a buffer film is used to separate the spacer film from each of the adjacent ferromagnetic films. FIGS. 16 and 17 show alternative disk configurations using the spacer film 412 and pair of buffer films 408 and 416 of the disk 400. The laminated information layer 1600 (FIG. 16) comprises first and second ferromagnetically coupled layers 1604 and 1608 separated by an interlayer 1612, while laminated information layer 1700 (FIG. 17) comprises first, second, and third ferromagnetically coupled layers 1704, 1708, and 1712 separated by interlayers 1716 and 1720.

Figure 18:
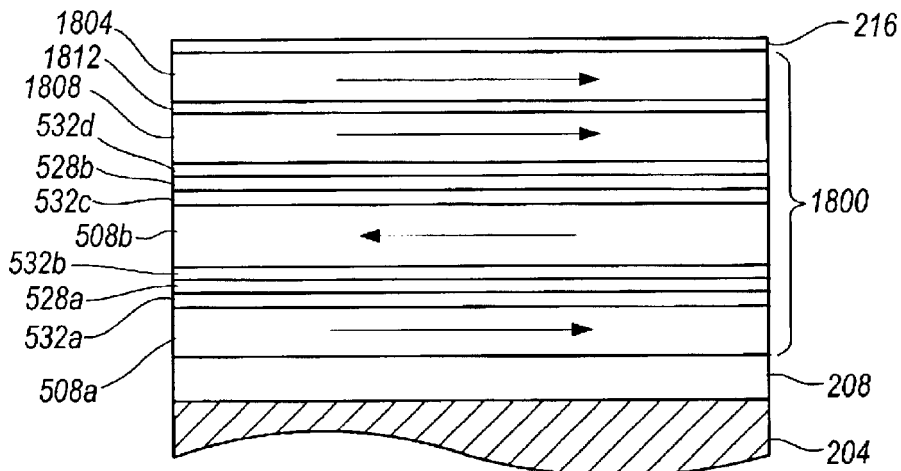
Figure 19:
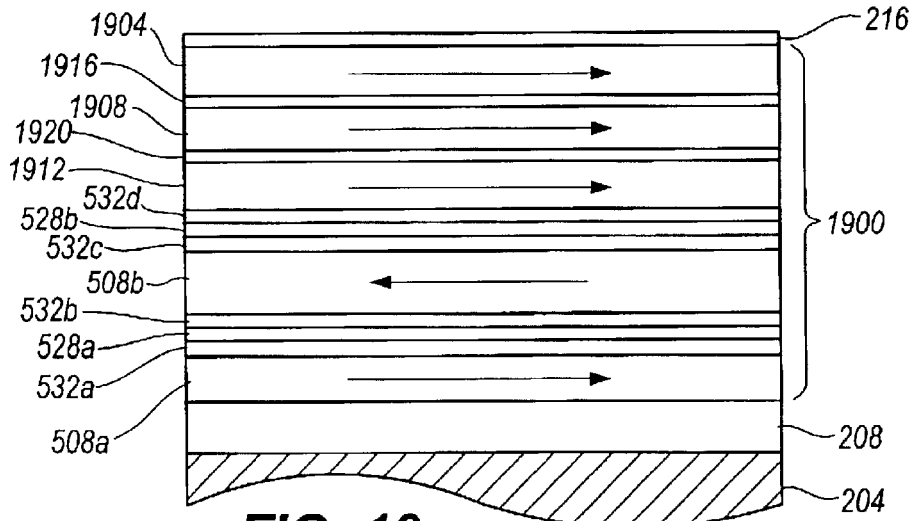

The information layer 504 of FIG. 5 comprises more than two ferromagnetic films, specifically stabilizing films 508a and 508b and information-containing film 512. The magnetic moments 516 and 520 of stabilizing film 508a and information-containing film 512 are substantially parallel while the magnetic moment 524 of stabilizing film 508b is substantially antiparallel to the magnetic moments of films 508a and 512. Between each adjacent pair of ferromagnetic films 508a and 508b and 508b and 512, a corresponding spacer film 528a and 528b is located. The corresponding spacer film 528a and 528b is separated from the respective adjacent pair of ferromagnetic films by a corresponding intermediate buffer film 532a, 532b, 532c, and 532d. FIGS. 18 and 19 show alternative disk configurations using the spacer films 528a, b and intermediate buffer films 532a–d of the disk 500. The laminated information layer 1800 (FIG. 18) comprises first and second ferromagnetically coupled layers 1804 and 1808 separated by an interlayer 1812, while laminated information layer 1900 (FIG. 19) comprises first, second, and third ferromagnetically coupled layers 1904, 1908, and 1912 separated by interlayers 1916 and 1920.

These embodiments are neither exclusive nor exhaustive. As will be appreciated, any number of other configurations are possible using the buffer layer(s) of the present invention.

EXAMPLES

Various disks having the disk configuration of FIG. 2 were formed having intermediate buffer layers of varying thicknesses. The disk configuration comprised an AlMg/NiP data zone textured substrate, a $CrMo_{10}$ underlayer, AFC CoCrPtB ferromagnetic films, a ruthenium spacer film, and a (superparamagnetic) CoCrRu intermediate buffer film. Intrinsic switching field $H_o$ and thermal stability ratios ($K_uV/k_BT$) were measured for the various thicknesses of intermediate buffer layers. Thermal decay values, iso-Signal Media Noise Ratio (IsoSMNR) and 2TSMNR were measured for the various disks using a Guzik spin stand at room temperature with the disks having a linear bit density of about 400 kbpi. Both $H_o$ and $K_uV/k_BT$ were obtained by fitting the vibrating sample magnetometer (VSM) measurement raw data into Sharrock's Law. X-Ray diffraction (XRD) 2θ/θ scans were taken of the Co ($11\overline{2}0$) peaks of the top ferromagnetic film without the intermediate buffer film and with varying thicknesses of the intermediate buffer film. Co ($11\overline{2}0$) rocking width ($\Delta\omega_{50}$) data were obtained. The results are shown in FIGS. 6A, 6B, 7-8, 10, 11A-11B, and 12C-12G.

Figures 6A, 6B:
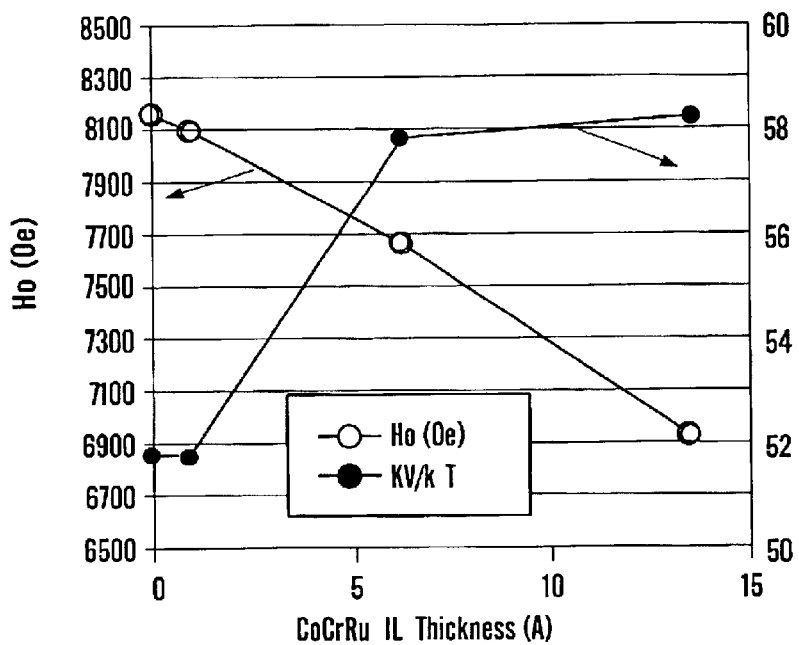
FIG. 6A is a plot of intrinsic switching field $H_o$ (vertical axis) versus intermediate buffer film thickness (horizontal axis) for the disk of FIG. 2.
FIG. 6B is a table providing, as a function of buffer film thickness, the corresponding values for $K_u V/k_B T$, $H_o$, and thermal decay in the disk of FIG. 2.

Referring to FIGS. 6A and 6B, while $K_u V/k_B T$ increases with intermediate buffer film thickness $H_o$ decreases from approximately 8100 Oe to as low as approximately 6900 Oe. Referring to FIG. 6B, it can further be seen that, with increasing thicknesses of the intermediate buffer films, the signal decay rate improves (becomes smaller). When the buffer layer is incorporated between the top ferromagnetic film and the ruthenium film, the thermal stability-ratio $K_u V/k_B T$ increases from 51.8 to a significantly higher 58.2. These results indicate an increase in the grain size and the grain volume V in the ferromagnetic films of the disks. This improvement is believed to be due primarily to the better initial grain growth in the top ferromagnetic film. The drop in $H_o$ (FIG. 6B) indicates that increasing thicknesses of the intermediate buffer film improves the writability of the top ferromagnetic film without compromising thermal stability of the ferromagnetic film, which is highly beneficial especially at high recording frequencies. The improved writability is believed to be due to the superparamagnetic behavior of the buffer film.

Figure 10:
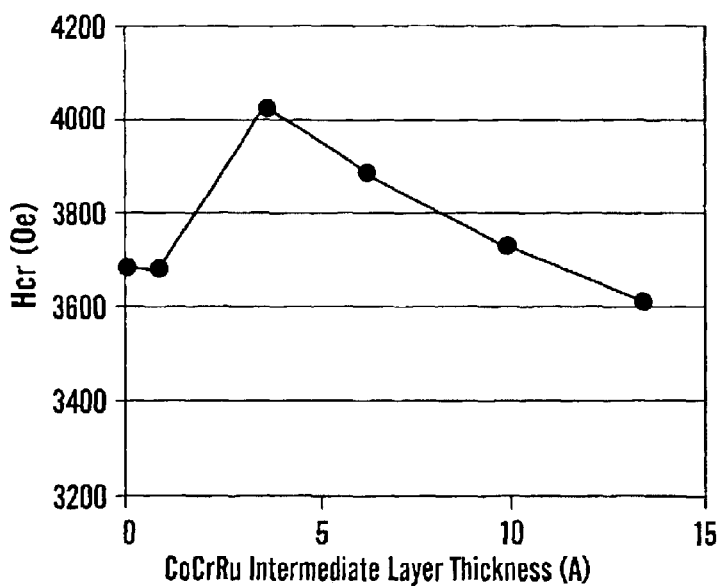
FIG. 10 is a plot of remanence coercivity $H_{cr}$ (vertical axis) versus intermediate buffer film thickness (horizontal axis) for the disk of FIG. 2.

Referring to FIG. 10, VSM remanence coercivity ($H_{CR}$) increases initially with the presence of the CoCrRu buffer film. Given a lower $H_o$, the increase in $H_{CR}$ should result from the increase in the grain size. The later decrease in $H_{CR}$ is due to the soft magnetic nature of the CoCrRu buffer film when magnetically coupled with the high-coercivity top ferromagnetic film.

Figure 7:
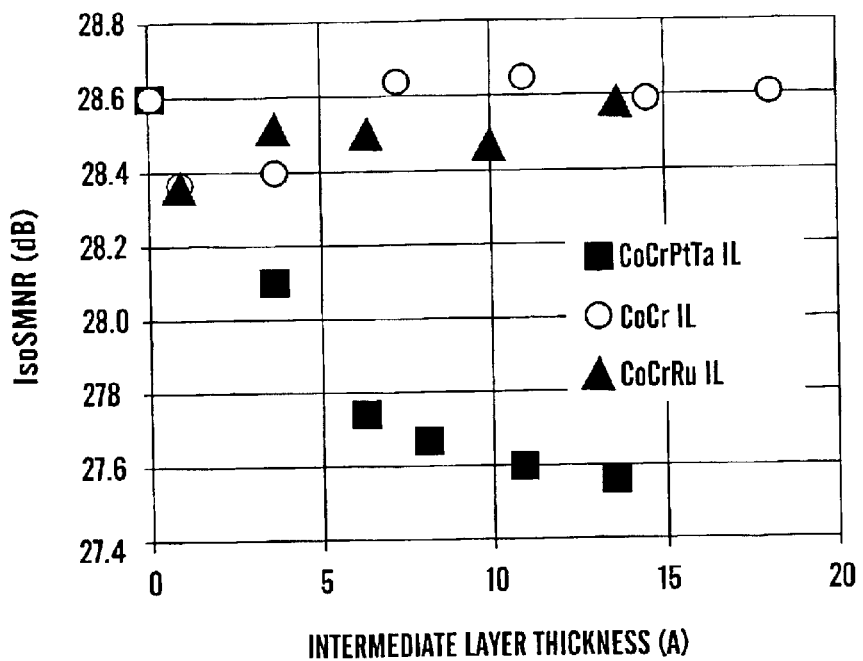
FIG. 7 is a plot of Iso-Signal Media Noise Ratio or IsoSMNR (vertical axis) versus intermediate buffer film thickness (horizontal axis) for the disk of FIG. 2.
Figure 8:
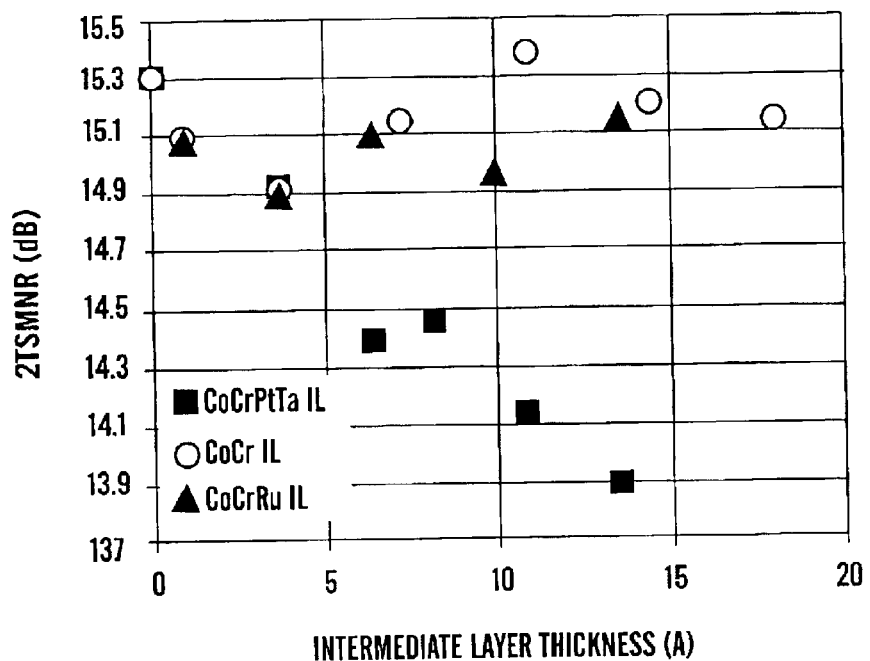
FIG. 8 is a plot of 2T-Signal Media Noise Ratio or 2TSMNR (vertical axis) versus intermediate buffer film thickness (horizontal axis) for the disk of FIG. 2.

FIGS. 7 and 8 show that the intermediate buffer films do not affect IsoSMNR and 2TSNMR. Therefore, the increase in $K_u V/k_B T$ and thus the ferromagnetic grain size should result from the reduced number of smaller grains instead of an increase in size of all grains. In other words, it is reasonable to believe that a tighter grain size distribution in the ferromagnetic layers is realized with the use of the buffer films. The figures also show that the buffer film maintains the signal-to-noise ratio at acceptable levels compared to conventional AFC media in which the ferromagnetic layers worsen the overall signal-to-noise ratio level.

Figures 11A, 11B:
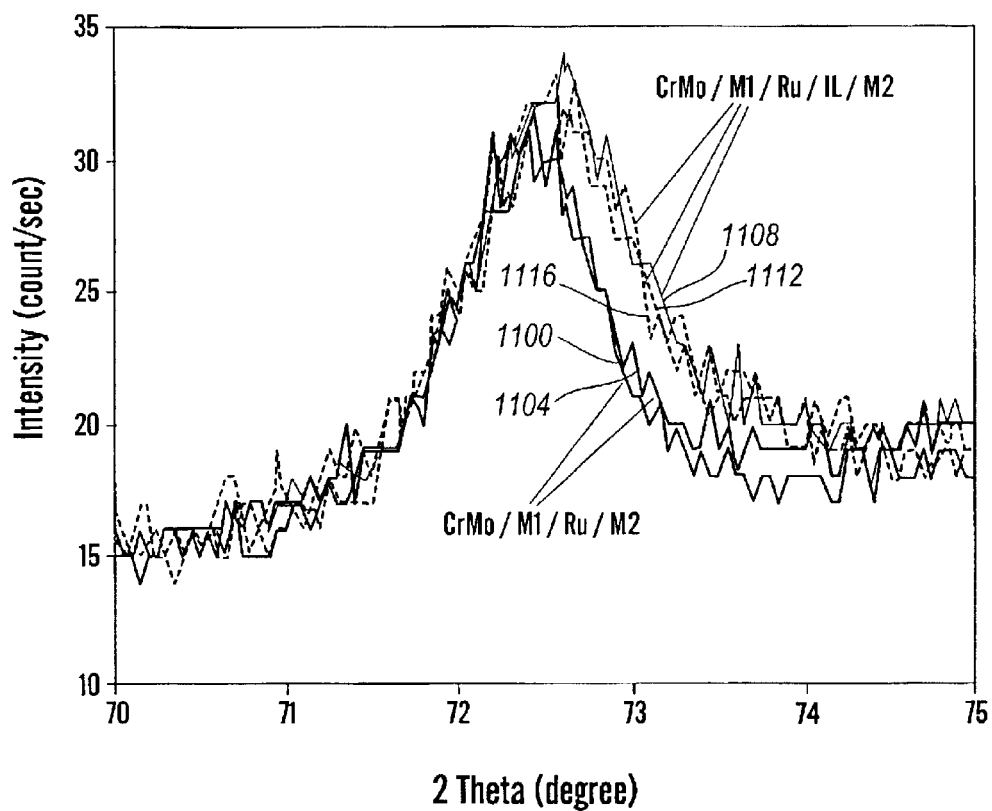
FIG. 11A is a plot of intensity (vertical axis) versus 2 Theta (horizontal axis) for the disk of FIG. 2.
FIG. 11B is a table showing rocking width values for various disk configurations.

FIGS. 11A and 11B show that the disks with intermediate buffer films (curves 1108, 1112, and 1116) have a higher angle peak shift than those disks without intermediate buffer films (curves 1100 and 1104) and, therefore, improved in-plane crystallographic structures for the ferromagnetic films. The shift is the result of the strain in the top ferromagnetic film due to the lattice matching at the interface of the top ferromagnetic film and the buffer film and the more favorable epitaxial growth conditions and higher miscibility at the interface. A 10 Å thick buffer film alone does not produce diffraction intensity strong enough to cause such a shift. The effect of the buffer film on the growth of the top ferromagnetic film is also revealed in the improved rocking peak width as shown in FIG. 11B.

Figure 12A:
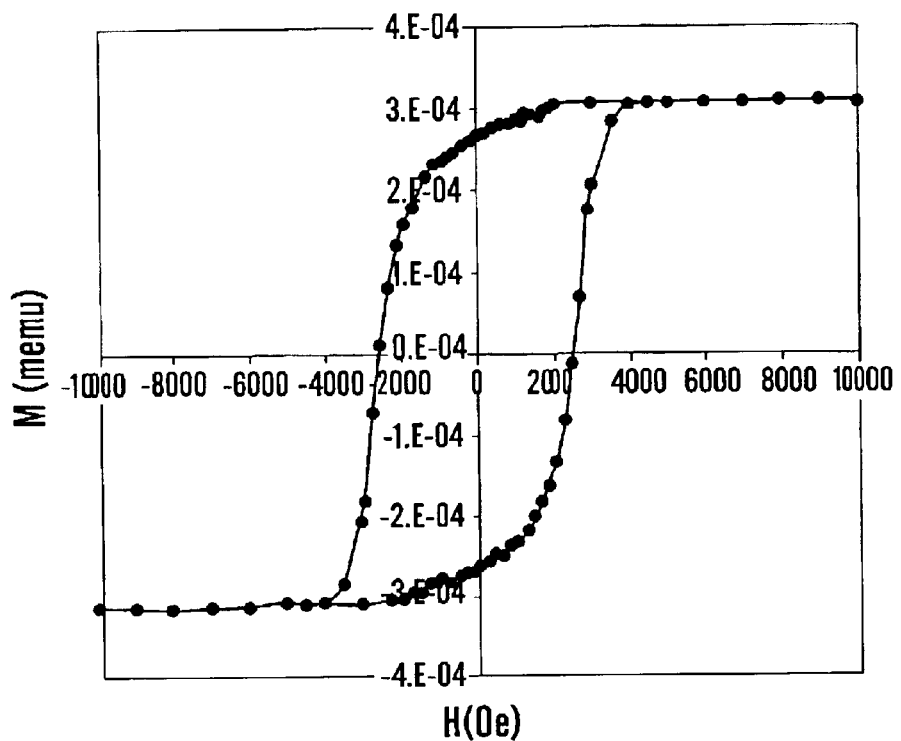
FIG. 12A is a hysteresis loop for a laminated recording layer without spacer and intermediate buffer films.
Figure 12B:
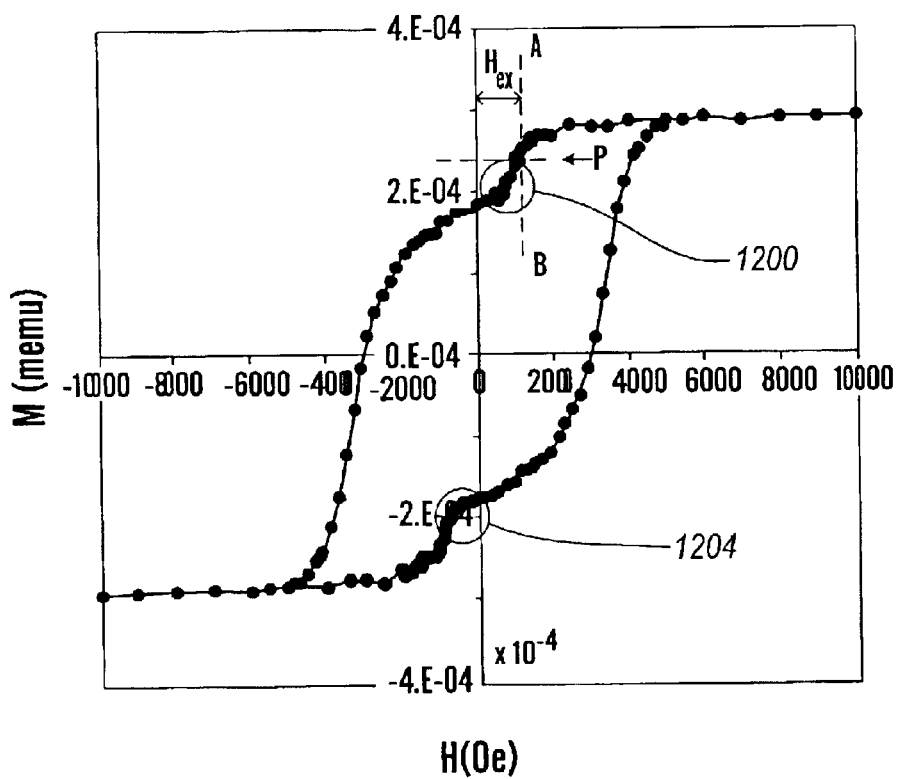
FIG. 12B is a hysteresis loop for a laminated recording layer with a spacer film and without an intermediate buffer film.
Figure 12C:
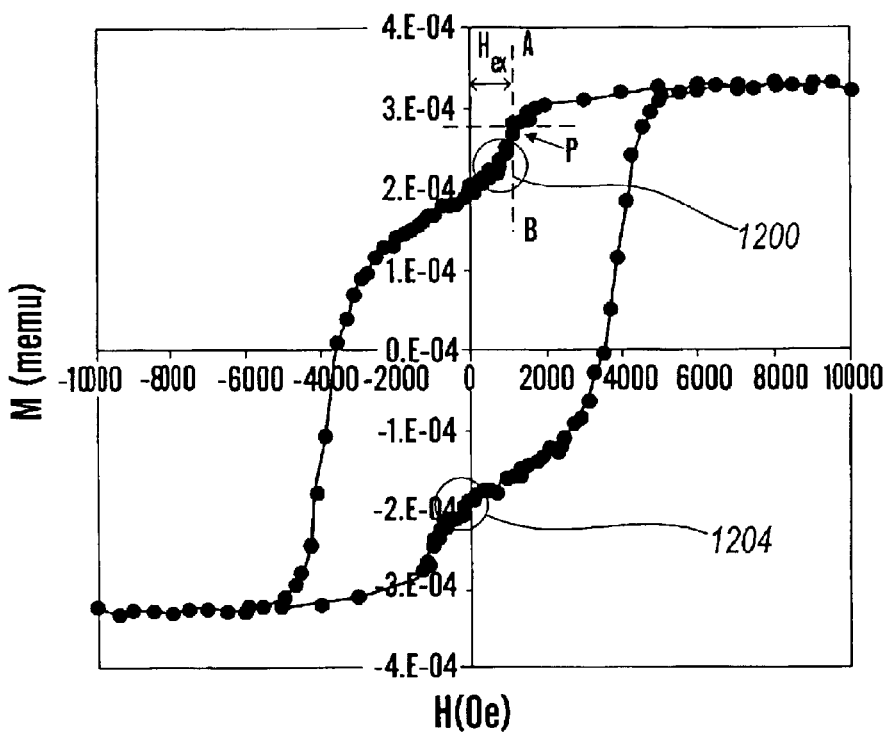
FIGS. 12C-12G are a series of hysteresis loops for a laminated recording layer with both a spacer film and an intermediate (superparamagnetic) buffer film in the disk configuration of FIG. 2.
Figure 12D:
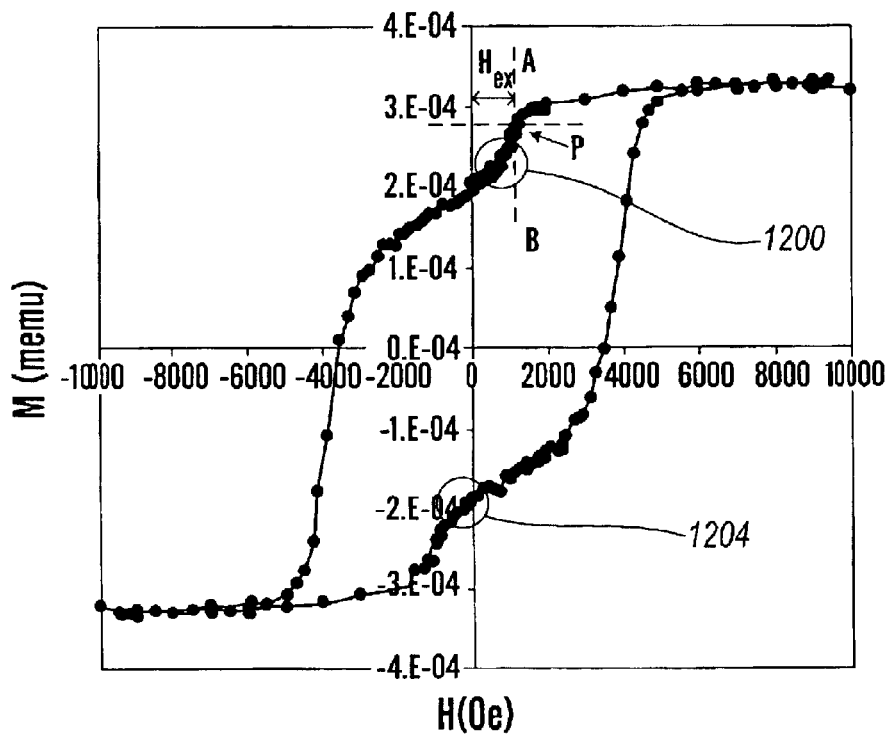
Figure 12E:
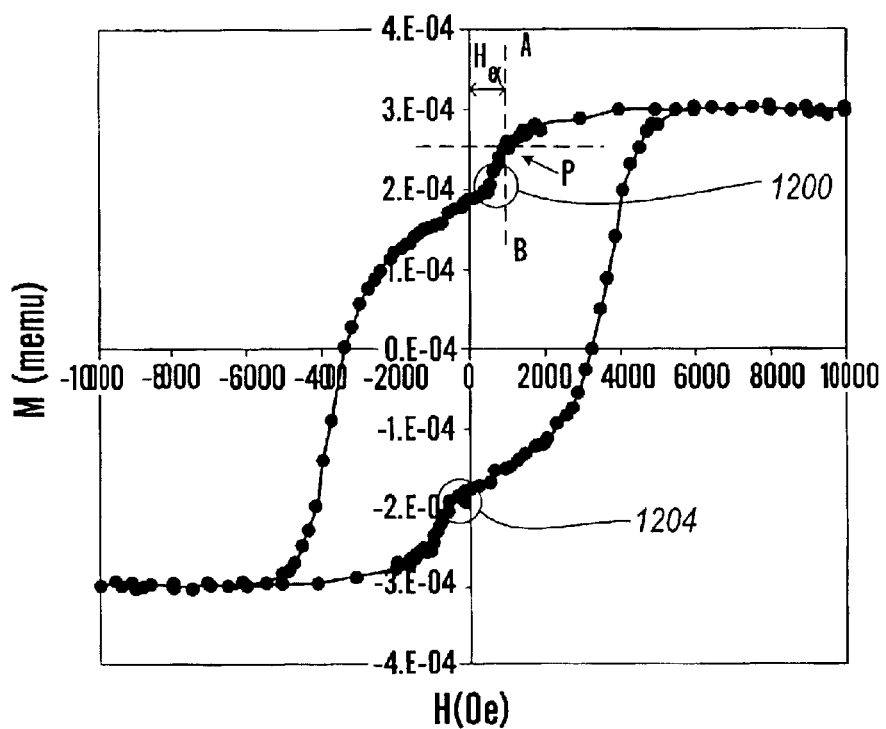
Figure 12F:
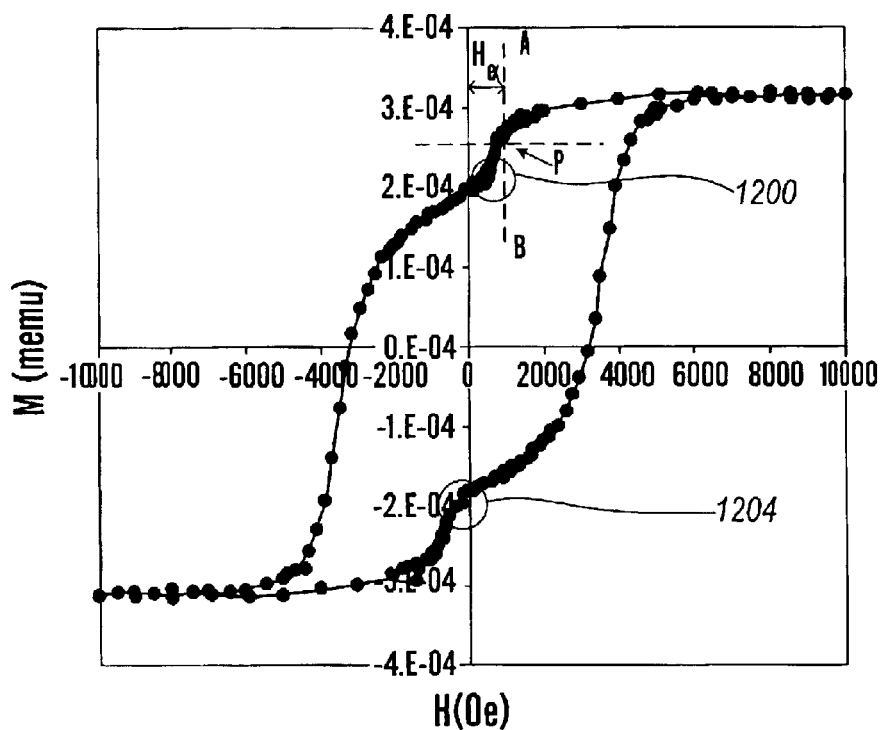

FIGS. 12C through 12G are hysteresis loops for the various disks. FIG. 12C is for a disk containing a 0.9 Å thick buffer film, FIG. 12D for a 3.6 Å thick buffer film, FIG. 12E for a 6.3 Å thick buffer film, FIG. 12F for a 9.9 Å thick buffer film, and FIG. 12G for a 13.5 Å thick buffer film. In each of the Figures, upper and lower "kinks" 1200 and 1204, respectively, are visible, which are characteristic of AFC media. Thus, the antiferromagnetic exchange coupling between the ferromagnetic films is maintained in the presence of the buffer film.

Figure 12G:
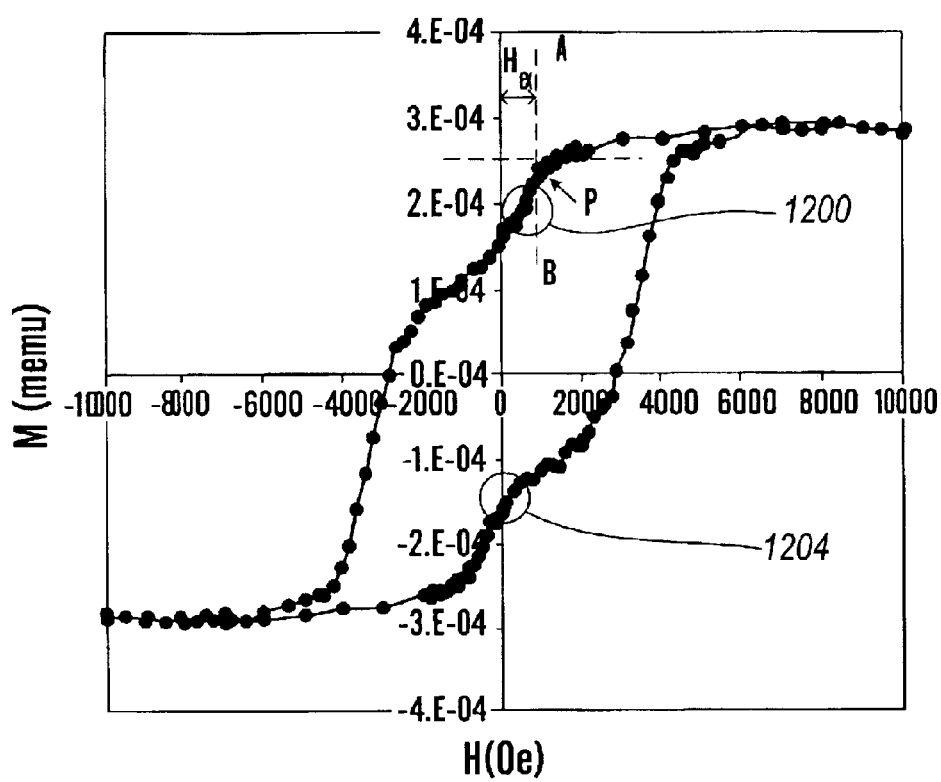

The $H_{ex}$ values in FIGS. 12C through 12G relative to the value of $H_{ex}$ in AFC media without a buffer film (FIG. 12B) indicate that the antiferromagnetic exchange coupling between the ferromagnetic films is improved by the buffer film. $H_{ex}$ in FIGS. 12B-G and 13A-F is a measure of the anti-parallel exchange coupling strength between the information-containing layer and stabilizing layer. $H_{ex}$ can be determined by measuring the distance between the Y axis and the vertical line A–B. Line A–B passes through point "P" on the hysteresis loop. Point "P" is a point on the loop in the midpoint of the step height. FIG. 12A shows a hysteresis loop for a disk having a non-AFC laminated information layer without spacer and buffer films (the hysteresis loop having no kinks), and FIG. 12B shows a hysteresis loop for a disk having an AFC laminated information layer with a ruthenium spacer film and without a buffer film. The disk corresponding to the hysteresis loop of FIG. 12B has the same structure and compositions as the disks of FIGS. 12C-12G with the exception of the buffer film. Comparing FIG. 12B with FIG. 12C, it can be seen that the applied fields H at kink locations 1200 in the corresponding hysteresis curves have different values. The value of H at point 1200 of FIG. 12C is higher than the value of H at point 1200 of FIG. 12B by at least 100 Oersteds. Similar comparisons exist for FIGS. 12D-12F. The antiferromagnetic exchange coupling for the disk of FIG. 12G is detrimentally impacted by the relatively thick buffer film indicating that there is an optimum buffer film thickness range.

Figure 13A:
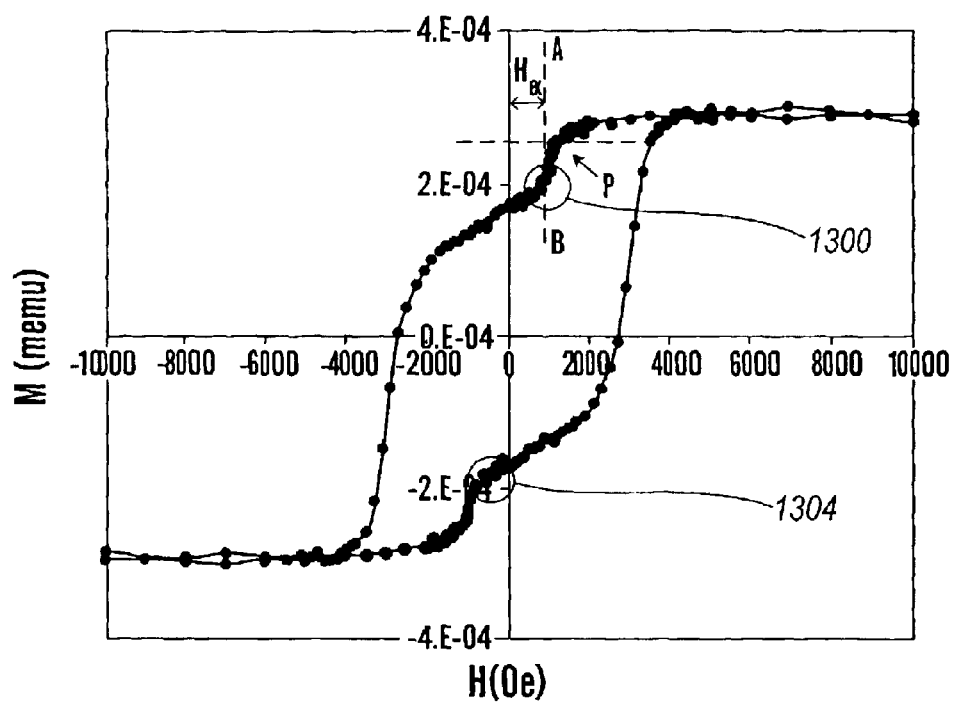
FIGS. 13A-13F are a series of hysteresis loops for a laminated recording layer with both a spacer film and an intermediate (paramagnetic) buffer film in the disk configuration of FIG. 2.
Figure 13B:
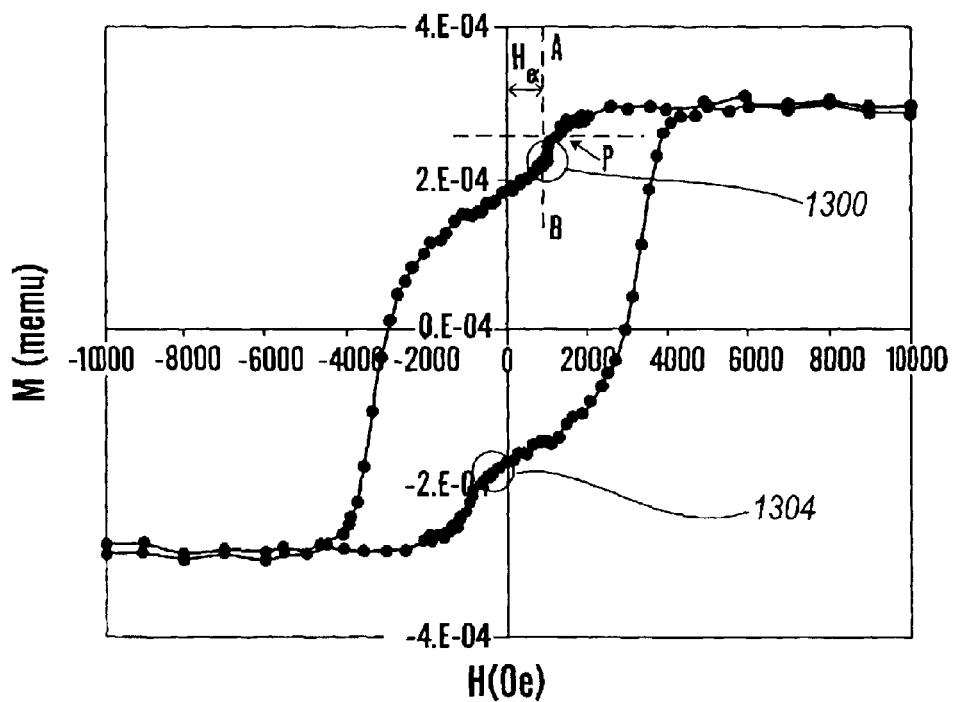
Figure 13C:
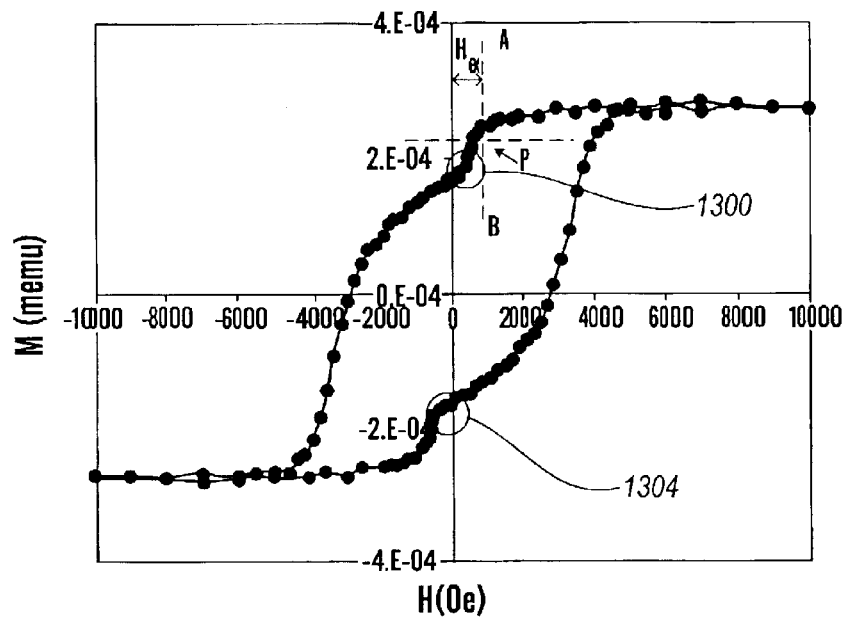
Figure 13D:
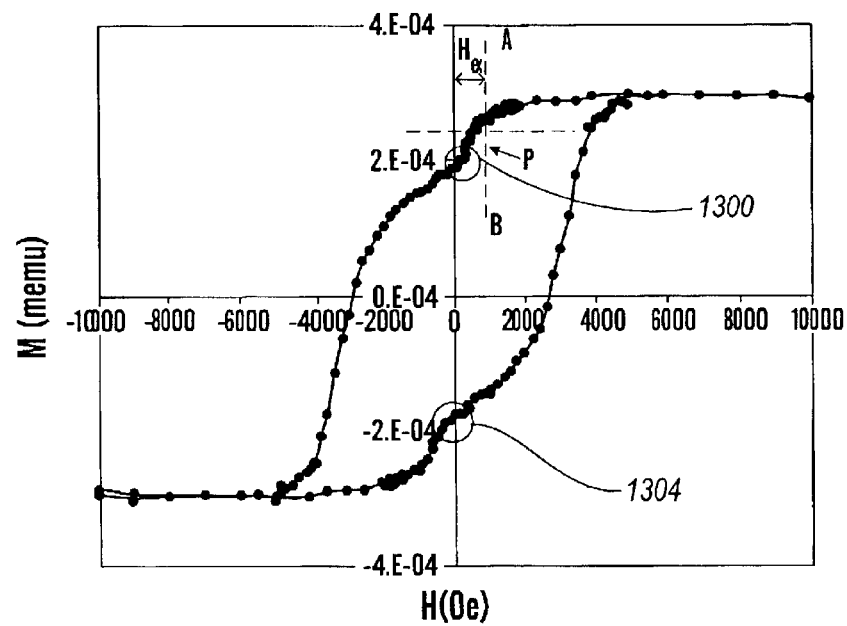
Figure 13E:
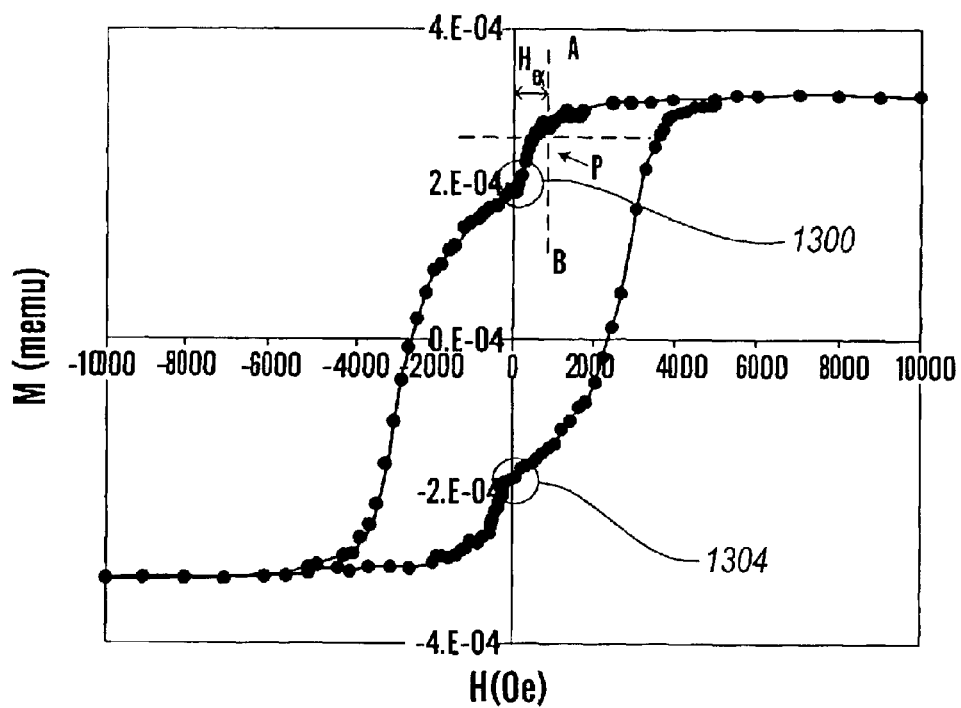
Figure 13F:
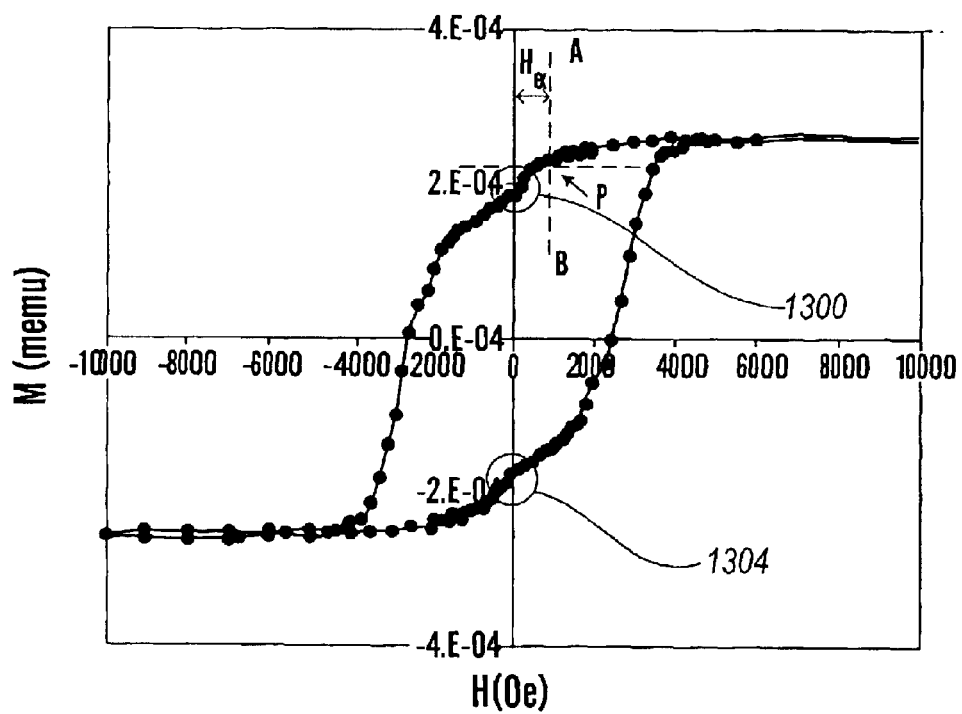

To compare the performance of a superparamagnetic buffer film with a paramagnetic buffer film, disks having the disk configuration of FIG. 2 were formed having intermediate paramagnetic buffer layers of varying thicknesses. The disk configuration comprised an AlMg/NiP data zone textured substrate, a $CrMo_{10}$ underlayer, AFC CoCrPtB ferromagnetic films, a ruthenium spacer film, and a (paramagnetic) $CoCr_{35}$ intermediate buffer film. Hysteresis loops were generated based upon various measurements taken from the disks. FIGS. 13A-13E show the results. FIG. 13A is for a disk containing a 1 Å thick buffer film, FIG. 13B for a 3.6 Å thick buffer film, FIG. 13C for an 11 Å thick buffer film, FIG. 13D for an 18 Å thick buffer film, FIG. 13E for a 36 Å thick buffer film, and FIG. 13F for a 55 Å thick buffer films.

Referring to FIGS. 13A-13E, it can be seen that the kinks 1300 and 1304 exist in each hysteresis loop, showing that the paramagnetic films do not disrupt antiferromagnetic exchange coupling. As in the case of the superparamagnetic buffer films of FIGS. 12C-12F, the antiferromagnetic exchange coupling is enhanced in the disks corresponding to FIGS. 13A and 13B. As in the case of FIG. 12G, a review of FIGS. 13C through 13F shows the antiferromagnetic exchange coupling worsening as the buffer film increases in thickness. Accordingly, there is an optimum thickness range for a paramagnetic buffer film as well as a superparamagnetic buffer film.

Figure 9:
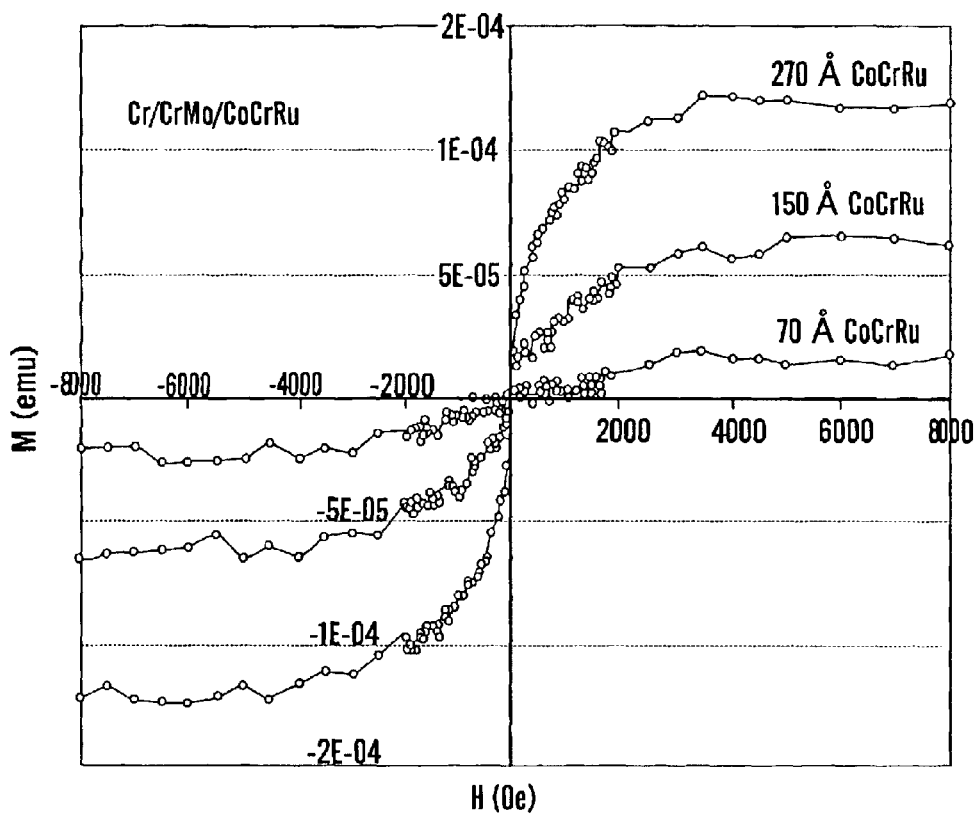
FIG. 9 is a plot of magnetic moment M (vertical axis) versus applied magnetic field H (horizontal axis) for a Cr/CrMo/CoCrRu layered structure.

Referring now to FIG. 9, VSM half loops of the CoCrRu buffer films in a number of disks having an AlMg/NiP/Cr/CrMo/CoCrRu layered structure were generated. The thicknesses of the CoCrRu layers in the various disks were varied. The thicknesses used were 70 Å, 150 Å, and 270 Å. The superparamagnetic component of the NiP layer was removed from each loop. FIG. 9 shows the superparamagnetic behavior of the CoCrRu layer. When H, the applied field, is zero, the net magnetic moment M is also zero.

A number of variations and modifications of the invention can be used. It would be possible to provide for some features of the invention without providing others.

For example, the nonferromagnetic intermediate buffer film can be selected to be nonparamagnetic and nonsuperparamagnetic. In this embodiment, the film composition is carefully selected so as not to disrupt the antiferromagnetic exchange coupling of the magnetic films.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving case and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A medium for information storage, comprising:
   (a) a substrate;
   (b) one of a ferromagnetically and antiferromagnetically exchange coupled first and second ferromagnetic films;
   (c) at least one buffer film located between the first and second ferromagnetic films, wherein the at least one buffer film has at least one of the following characteristics: (i) the at least one buffer film has a Curie temperature that is about 50° C. or less; and (ii) a lattice mismatch between the at least one buffer film and each of the first and second ferromagnetic films in contact with the at least one buffer film is about 5% or less and the at least one buffer film is superparamagnetic; and
   (d) a spacer film located between the first and second ferromagnetic films, wherein the at least one buffer film is located between and in contact with the spacer film and one of the first and second ferromagnetic films.

2. The medium of claim 1, wherein the buffer film comprises from about 50 to about 90 atomic % cobalt and at least one of chromium, ruthenium, boron, tantalum, and platinum.

3. The medium of claim 2, wherein the buffer film comprises chromium and the chromium content is about 40 atomic % or less.

4. The medium of claim 1, wherein statement (i) is true.

5. The medium of claim 4, wherein the buffer film comprises from about 50 to about 90 atomic % cobalt and at least one of chromium, ruthenium, boron, tantalum, and platinum.

6. The medium of claim 5, wherein the buffer film comprises from about 50 to about 90 atomic % cobalt and ruthenium and the ruthenium content is about 30 atomic % or less.

7. The medium of claim 5, wherein the value of $K_uV$, where $K_u$ is the magnetic anisotropic energy of the buffer film and V is the average volume of the grains in the buffer film, is no more than about 25 kT.

8. The medium of claim 1, wherein statement (ii) is true and the at least one buffer film is superparamagnetic.

9. The medium of claim 8, wherein the lattice mismatch is no more about 2%.

10. The medium of claim 8, wherein the crystallographic structure of the buffer film is hexagonal close-packed.

11. The medium of claim 8, wherein the value of $K_uV$, where $K_u$ is the magnetic anisotropic energy of the at least one of the first and second ferromagnetic films in contact with the buffer film and V is the average volume of the grains in the at least one of the first and second ferromagnetic films in contact with the buffer film, is at least about 40 kT.

12. The medium of claim 11, wherein the mean diameter of the grains in the at least one of the first and second ferromagnetic films in contact with the buffer film is at least about 50 Å.

13. The medium of claim 11, wherein at least 80% of the grains in the at least one of the first and second ferromagnetic films in contact with the buffer film have a diameter ranging from about 60 to about 90 Å.

14. The medium of claim 1, wherein a first buffer film is located between the first ferromagnetic film and the spacer film and a second buffer film is located between the second ferromagnetic film and the spacer film.

15. The medium of claim 1, wherein the first and second ferromagnetic films are cobalt alloys and comprises more than 7 atomic % boron.

16. The medium of claim 1, wherein the thickness of the buffer film ranges from about 0.5 to about 25 Å.

17. The medium of claim 1, wherein the one of ferromagnetically and antiferromagnetically exchange coupled is ferromagnetically exchange coupled.

18. The medium of claim 1, wherein the one of ferromagnetically and antiferromagnetically exchange coupled is antiferromagnetically exchange coupled.

19. A medium for information storage, comprising:
   (a) a substrate;
   (b) exchange coupled first and second ferromagnetic films;
   (c) at least one buffer film located between the first and second ferromagnetic films, wherein the at least one buffer film has at least one of the following characteristics: (i) the buffer film is paramagnetic and (ii) the buffer film is superparamagnetic at temperatures of about 50° C. or less; and
   (d) a spacer film located between the first and second ferromagnetic films, wherein the at least one buffer film is located between and in contact with the spacer film and one of the first and second ferromagnetic films.

20. The medium of claim 19, wherein statement (i) is true.

21. The medium of claim 20, wherein the buffer film comprises from about 50 to about 90 atomic % cobalt and at least one of chromium, ruthenium, boron, tantalum, and platinum.

22. The medium of claim 21, wherein the buffer film comprises chromium and the chromium content is about 40 atomic % or less.

23. The medium of claim 19, wherein statement (ii) is true.

24. The medium of claim 23, wherein the buffer film comprises from about 50 to about 90 atomic % cobalt and at least one of chromium, ruthenium, boron, tantalum, and platinum.

25. The medium of claim 24, wherein the buffer film comprises from about 50 to about 90 atomic % cobalt and ruthenium and the ruthenium content is about 30 atomic % or less.

26. The medium of claim 24, wherein the value of $K_uV$, where $K_u$ is the magnetic anisotropic energy of the buffer film and V is the average volume of the grains in the buffer film, is no more than about 25 kT.

27. The medium of claim 19, wherein the first and second ferromagnetic films are antiferromagnetically exchange coupled.

28. The medium of claim 19, wherein the first and second ferromagnetic films are ferromagnetically exchange coupled.

29. The medium of claim 19, wherein a first buffer film is located between the first ferromagnetic film and the spacer film and a second buffer film is located between the second ferromagnetic film and the spacer film.

30. The medium of claim 19, wherein the first and second ferromagnetic films are cobalt alloys.

31. The medium of claim 30, wherein a lattice mismatch between the buffer film and at least one of the first and second ferromagnetic films in contact with the buffer film is about 5% or less.

32. The medium of claim 30, wherein the first magnetic film is in contact with the buffer film and comprises more than 7 atomic % boron.

33. The medium of claim 19, wherein the thickness of the buffer film ranges from about 0.5 to about 25 Å.

34. A medium for information storage, comprising:
 (a) a substrate;
 (b) exchange coupled first and second ferromagnetic films;
 (c) at least one buffer film located between the first and second ferromagnetic films, wherein the at least one buffer film has at least one of the following characteristics: (i) the buffer film has a value of $K_uV$, where $K_u$ is the magnetic anisotropic energy of the buffer film and V is the average volume of the grains in the buffer film, and the value of $K_uV$ is no more than about 25 kT and (ii) the buffer film has a Curie temperature that is about 50° C. or less; and
 (d) a spacer film located between the first and second ferromagnetic films, wherein the at least one buffer film is located between and in contact with the spacer film and one of the first and second ferromagnetic films.

35. The medium of claim 34, wherein statement (i) is true.

36. The medium of claim 35, wherein the buffer film comprises from about 50 to about 90 atomic % cobalt and at least one of chromium, ruthenium, boron, tantalum, and platinum.

37. The medium of claim 36, wherein the buffer film comprises chromium and the chromium content is about 40 atomic % or less.

38. The medium of claim 34, wherein statement (ii) is true.

39. The medium of claim 38, wherein the buffer film comprises from about 50 to about 90 atomic % cobalt and at least one of chromium, ruthenium, boron, tantalum, and platinum.

40. The medium of claim 39, wherein the buffer film comprises from about 50 to about 90 atomic % cobalt and ruthenium and the ruthenium content is about 30 atomic % or less.

41. The medium of claim 39, wherein the value of $K_uV$ for each of the first and second ferromagnetic films, where $K_u$ is the magnetic anisotropic energy of a corresponding one of the first and second ferromagnetic films and V is the average volume of the grains in the corresponding one of the first and second ferromagnetic films, is at least about 40 kT.

42. The medium of claim 34, wherein the first and second ferromagnetic films are antiferromagnetically exchange coupled.

43. The medium of claim 34, wherein the first and second ferromagnetic films are ferromagnetically exchange coupled.

44. The medium of claim 34, wherein a first buffer film is located between the first ferromagnetic film and the spacer film and a second buffer film is located between the second ferromagnetic film and the spacer film.

45. The medium of claim 34, wherein the first and second ferromagnetic films are cobalt alloys and comprises more than 7 atomic % boron.

46. The medium of claim 34, wherein the thickness of the buffer film ranges from about 0.5 to about 25 Å.

47. The medium of claim 34, wherein a lattice mismatch between the buffer film and at least one of the first and second ferromagnetic films in contact with the buffer film is no more than about 5% or less.

48. A medium for information storage, comprising:
 (a) a substrate;
 (b) one of a ferromagnetically and antiferromagnetically exchange coupled first and second ferromagnetic films; and
 (c) at least one buffer film located between the first and second ferromagnetic films, wherein the at least one buffer film is superparamagnetic at temperatures about 65° C. or less and wherein the buffer film comprises from about 50 to about 90 atomic % cobalt and at least one of chromium, ruthenium, boron, tantalum, and platinum.

49. The medium of claim 48, wherein the value of $K_u V$, where $K_u$ is the magnetic anisotropic energy of the buffer film and V is the average volume of the grains in the buffer film, is no more than about 25 kT.

50. A medium for information storage, comprising:
 (a) a substrate;
 (b) exchange coupled first and second ferromagnetic films; and
 (c) at least one buffer film located between the first and second ferromagnetic films, wherein the at least one buffer film is superparamagnetic at temperatures of about 50° C. or less and wherein the buffer film comprises from about 50 to about 90 atomic % cobalt and at least one of chromium, ruthenium, boron, tantalum, and platinum.

51. The medium of claim 50, wherein the value of $K_uV$, where $K_u$ is the magnetic anisotropic energy of the buffer film and V is the average volume of the grains in the buffer film, is no more than about 25 kT.

52. A medium for information storage, comprising:
 (a) a substrate;
 (b) exchange coupled first and second ferromagnetic films;
 (c) at least one buffer film located between the first and second ferromagnetic films, wherein the at least one buffer film has at least one of the following characteristics: (i) the buffer film is paramagnetic and (ii) the buffer film is superparamagnetic at temperatures of about 50° C. or less, (d) wherein the first and second ferromagnetic films are cobalt alloys, and wherein a lattice mismatch between the buffer film and at least one of the first and second ferromagnetic films in contact with the buffer film is about 5% or less.

53. The medium of claim 52 wherein characteristic (i) is true.

54. The medium of claim 52, wherein characteristic (ii) is true.

55. A medium for information storage, comprising:
(a) a substrate;
(b) exchange coupled first and second ferromagnetic films;
(c) at least one buffer film located between the first and second ferromagnetic films, wherein the at least one buffer film has at least one of the following characteristics: (i) the buffer film is paramagnetic and (ii) the buffer film is superparamagnetic at temperatures of about 50° C. or less, (d) wherein the first and second ferromagnetic films are cobalt alloys, and wherein the first magnetic field is in contact with the buffer film and comprises more than 7 atomic % boron.

56. The medium of claim 55, wherein characteristic (i) is true.

57. The medium of claim 55, wherein characteristic (ii) is true.

58. A medium for information storage, comprising:
(a) a substrate;
(b) exchange coupled first and second ferromagnetic films; and
(c) at least one buffer film located between the first and second ferromagnetic films, wherein the at least one buffer film has a Curie temperature that is about 50° C. or less.

59. The medium of claim 58, wherein the buffer film comprises from about 50 to about 90 atomic % cobalt and at least one of chromium, ruthenium, boron, tantalum, and platinum.

60. The medium of claim 58, wherein the buffer film comprises from about 50 to about 90 atomic % chromium and ruthenium and the ruthenium content is about 30 atomic % or less.

61. The medium of claim 58, wherein the value of $K_u V$ for each of the first and second ferromagnetic films, where $K_u$ is the magnetic anisotropic energy of a corresponding one of the first and second ferromagnetic films and V is the average volume of the grains in the corresponding one of the first and second ferromagnetic films, is at least about 40 kT.

* * * * *